United States Patent [19]

Barnes

[11] Patent Number: 4,610,913
[45] Date of Patent: Sep. 9, 1986

[54] LONG WAFER WAFERBOARD PANELS

[75] Inventor: Derek Barnes, British Columbia, Canada

[73] Assignee: MacMillan Bloedel Limited, Vancouver, Canada

[21] Appl. No.: 829,564

[22] Filed: Feb. 14, 1986

[51] Int. Cl.$^4$ .......................... B32B 5/16; B32B 21/02
[52] U.S. Cl. ..................................... 428/215; 428/218; 428/326; 428/528; 428/529; 428/535; 156/62.2
[58] Field of Search ............................................ 428/215

[56] References Cited

U.S. PATENT DOCUMENTS

| | | | |
|---|---|---|---|
| Re. 30,636 | 2/1981 | Barnes | 428/294 |
| 2,773,789 | 12/1956 | Clark | 428/44 |
| 2,786,005 | 3/1957 | Clark | 428/44 |
| 3,164,511 | 1/1965 | Elmendorf | 428/110 |
| 4,246,310 | 1/1981 | Hunt et al. | 428/106 |
| 4,361,612 | 11/1982 | Shaner et al. | 428/106 |
| 4,404,252 | 9/1983 | Hetzler | 428/326 |
| 4,492,726 | 1/1985 | Rosenberg | 428/326 X |

OTHER PUBLICATIONS

Elmendorf, "Wood Fibers from Veneer Waste," Paper Trade Journal, pp. 29-31, Feb. 9, 1950.
Turner, "Effect of Particle Size and Shape on Strength and Dimensional Stability of Resin-Bonded Wood-Particle Panels," Journal of FPRS, pp. 210-223, Oct. 1954.
Shuler et al, "Effect of Flake Geometry on Mechanical Properties of Eastern Spruce Flake-Type Particleboard," Forest Products Journal, vol. 26, No. 6, pp. 24-28, Jun. 1976.
Maloney, "Modern Particleboard & Dry-Process Fiberboard Manufacturing," Miller Freeman Publications, pp. 186-203, published 1977.
Ikeda et al, "Effect of Chip Length on Creep Properties of Particleboard," Mokuzai Gakkaishi 25 (5), pp. 332-337 (1979) (Translation).
Walter et al, "Effect of Chip Size on Some Strength Properties of Oriented Structural Board," Holz Als Roh-Und Werkstoff 37, pp. 183-188 (1979) (Translation).
Vajda, "Waferboard vs Oriented Structural Board (OSB)," Proceedings of the Fourteenth Washington State University International Symposium on Particleboard, pp. 21-30, (Apr. 1980).
Fyie et al, "Electrostatic Orientation for Efficiency and Engineering Composition Panel Properties," Proceedings of the Fourteenth Washington State University International Symposium on Particleboard, pp. 261-280, (Apr. 1980).
Leitner, "Structural Board: A Three-Layer Alternative to Waferboard and OSB," Proceedings of the Fourteenth Washington State University International Symposium on Particleboard, pp. 31-38, (Apr. 1980).
Clark, "How it All Started: The History of Waferboard," Canadian Waferboard Symposium, Publication SP 505E, pp. 4-14 (1980).
Maloney, "Larger Flakes Give Illusion of Structural Board Strength," Plywood & Panel World, p. 16, (Apr. 1983).
Siempelkamp, "OSB Mat Forming Factors," pp. 1-6, published 1983.

Primary Examiner—P. C. Ives
Attorney, Agent, or Firm—Banner, Birch, McKie & Beckett

[57] ABSTRACT

A waferboard panel is made from long wafers to have the same strength properties as plywood. The panel comprises at least three layers of wood wafers having an initial aggregate specific gravity, less than about 0.6 oven dry weight with volume at 12% moisture content, the panel having face layers on outside surfaces and at least one core layer. The wafers in the face layers have a mean orientation not greater than about 10°, and lengths of at least about 6 inches, preferably 12 inches. Average widths of the wafers in the face layers are in the range of about 0.3 to 2.0 inches and the panel has an oven dry wood density in the range of about 28 to 45 lbs. per cu. ft. with an MOR to density ratio of at least about 120 and an MOE (M) to density ratio of at least about 40.

15 Claims, 5 Drawing Figures

LONG WAFER WAFERBOARD PANELS

This application is a continuation of application Ser. No. 723,641, filed Apr. 16, 1985, now abandoned.

The present invention relates to waferboard panels made with long wafers to produce a structural panel board having strength and stiffness properties equivalent to plywood.

If waferboard panels can be used in place of plywood, there are substantial advantages.

Plywood is made from veneer sheets which are sliced or peeled from logs and this requires a reasonably high grade of logs. Wafers are cut on a waferizer from lower grade logs and have a higher wood yield than in the preparation of veneer. Capital costs are less for waferboard plants than for plywood plants, and waferboard manufacturing costs are less than the manufacturing costs of making plywood. However, waferboards have a major disadvantage relative to plywoods, namely they have a low strength to density ratio. Comparing strength to density ratios, both modulus of rupture to density ratio and modulus of elasticity to density ratio is far lower for waferboard than for plywood.

Construction grade Southern pine plywood (CDX) has an average modulus of rupture (MOR) of about 6,000 lbs. per. sq. inch and a modulus of elasticity (MOE) of about 2,000 M lbs. per sq. in. at a density of 37 lbs. per cu. ft. to give an MOR/Density ratio of 162 and an MOE(M)/Density of 54.05. Douglas fir 5-ply CDX sheathing has an MOR/Density ratio of 126 and an MOE(M)/Density ratio of 45.2.

Non oriented waferboard made from 1½" (38 mm) long wafers and a resin content of 2.3% has an MOR of about 2,700 lbs. per sq. in. and an MOE of about 500 M lbs. per sq. in. at a density of 41½ lbs. per cu. ft. to give an MOR/Density ratio of 65 and an MOE(M)/Density ratio of 12.0. As can be seen the MOR/density ratio of waferboard is about one third that of plywood.

A machine oriented strand board made with 3" long (75 mm) wafers and higher resin contents can increase the strength/density ratios, but they are still only about half that of plywood.

The strength properties of waferboard can be increased by increasing density, or increasing resin content, however, increased density raises wood cost and transportation cost, makes the product heavier to handle, causes greater thickness swell when wet and reduces productivity when plant is wood processing limited. If the resin content is increased say from 3% to 6%, the manufacturing costs increase by about 15%.

In the past, panel boards such as particle board, fiberboard, waferboard, flakeboard, oriented strand board (O.S.B.) have generally been made with wafers or flakes having lengths not more than 100 mm (4 inches). H. Dale Turner, in an article entitled 'Effect of Particle Size and Shape on Strength and Dimensional Stability of Resin Bonded Wood Particle Panels', published October 1954 in the journal of F.R.P.S., describes tests carried out on wafers having lengths up to 3 inches and concluded that 1½ inch was the most economic length of wood wafers for the production of waferboard or strand board. In an article entitled "The Effect of Flake Geometry on Mechanical Properties of Eastern Spruce Flake-Type Particle Board", by Craig A. Schuler, and Robert A. Kelly, published in Forest Products Journal of June 1976, tests were carried out on flake lengths of 1 and 3 inches and the article concludes that flake length is a significant factor for modulus of elasticity, (MOE) modulus of rigidity (MOR) and internal bond (IB). The article does not suggest flake lengths higher than 3 inches.

T. M. Maloney, in 'Modern Particle Board and Dry Process Fiberboard Manufacturing',published in 1977 by Miller Freeman Publications, concludes that 4 inches is the maximum flake length that should be used in the preparation of flakeboards, (page 194).

Long wood strands of up to 24" and longer are well suited for use in structural lumber products. One example of a structural lumber product is Barnes, U.S. Pat. No. 4,061,819, published Dec. 6, 1977, which was reissued as U.S. Pat. No. Re.- 30,636 on June 2, 1981. This patent clearly shows that long wood strands having lengths of at least 12 inches, may be used to produce a discrete dimensional structural lumber product. Waferboard panels, however, are generally made in layers having wafers in different orientations and do not generally have the strength requirements of a structural lumber product. Furthermore, wafers or flakes are generally made of a thinner material than strands used in structural lumber products in order to have layers of flakes or wafers to form a panel.

In the past, it has not been considered feasible to use the structural lumber technology for the manufacture of waferboards. For example, even though the use of strands over 12 inches long has been known since at least as early as 1977, relating to the manufacture of structural lumber products, an article published by K. Walter, J. Kieser and T. White, entitled 'Effect of Chip Size, on Some Strength Properties of Oriented Strand Board (OSB)' (pages 183 to 188) published in 1979 in Holz Als Roh-Und Werkstoff, discloses that chip lengths greatly effect the strength properties, however, the lengths disclosed relate to 30, 50 and 80 mm, (1¼, 2, 3¼ ins.) and no suggestion is made for lengths greater than these.

In a paper by Tomohisa Ikeda and Tomio Takemura, entitled 'Effect of Chip Length on Creep Properties of Particleboard', (pages 332 to 337), published May 25, 1979 in Mokuzai Gakkaishi, tests were carried out on wafer lengths up to 80 mm long ( 3¼ ins.) but it was concluded that there was no benefit to be gained for wafer lengths beyond 40 mm in length (1½ ins.).

In the proceedings of the 14th Washington State University International Symposium on Particleboard, which were published in April 1980, the consensus in the published papers was that there were no advantages in increasing wafer length. P. Vajda, in his paper entitled, 'Waferboard vs Oriented Structural Board', (April 1980), on page 25 states "Increasing flake or wafer size to 3 inches or possibly 4 inches as proposed by some, will also improve MOR and MOE, but also to a limited degree. Moreover, increasing length and width results in increased difficulties in the flaking, conveying, binning, blending and forming operations, and also constitutes a considerable departure from what may be assumed as proven technology".

J. A. Fyie, D. J. Henckel and T. E. Peters, in their paper entitled, 'Electro-static Orientation for Efficiency and Engineering Composition Panel Properties', (April 1980), talk about shorter flake lengths on page 277. "We have made single layer flake boards from both 40 mm (1½ inches) and 70 mm (2¾ inches) flakes and found only a thirteen percent decrease in MOE for the shorter flake geometry. The decrease is tolerable and the shorter flake may lead to fewer handling blending and conveying problems...".

R. T. Leitner and his paper entitled, 'Structural Board: a 3-Layer Alternative to Waferboard and OSB' (April 1980), states on page 34 that "Long wafers are costly and difficult to produce". He concludes on the next page that "little improvement could be expected by increasing flake length much above 1 inch".

From these reports, it is clear that those skilled in the art of producing waferboards, oriented strand boards and other types of panel boards, have never applied the long strand technology concerned with structural lumber products to the production of waferboards.

As can be seen from these articles described above relating to waferboard, it has always been considered that there was no advantage in increasing wafer lengths over about 100 mm (4 ins.). No one has previously considered that a waferboard product could be made with long wafers or that such a product attained the full strength properties of the wood at or approaching normal wood density.

Furthermore, while it is considered by those skilled in the art of waferboard technology, that the problems arising with handling, storing, blending and resin coating long wafers would be too difficult or costly to resolve. This has been found incorrect. It has now been found that by increasing wafer lengths to over 6 ins. and preferably over 12 ins., the wafers having an initial aggregate specific gravity of less than 0.6 oven dry weight with volume at 12% moisture content, and using such wafers in the face layers of a multiple layer waferboard together with core wafers of sufficient thickness, and/or sufficient resin content to prevent horizontal shear failure in the core layer, a wood panel can be prepared having substantially the same strength/density ratios as an equivalent plywood.

Long wafers can be properly coated with resin in either powder or liquid form. One example of an apparatus to blend long wood wafers with a liquid resin is disclosed in our copending application, U.S. Ser. No. 441,925 filed Nov. 15, 1982, now U.S. Pat. No. 4,478,896. It has also been found that long wafers can be laid in a mat of substantially uniform thickness. One such device for forming such a mat is shown in our co-pending application U.S. Ser. No. 420,084 filed Sept. 20, 1982, now U.S. Pat. No. 4,494,919. The apparatus spreads the wood wafers in a uniform manner to provide a mat having substantially even thickness. The wafers may be laid in an oriented pattern or in a random pattern.

The present invention provides a waferboard panel with increased strength properties, comprising at least three layers of wood wafers having an initial aggregate specific gravity less than about 0.6 oven dry weight, with volume at 12% moisture content, the panel having face layers on outside surfaces and at least one core layer, the wafers in the face layers having a mean orientation in the range of about 2 to 10 degrees, the wafers in the face layers having lengths of at least about 6 inches, and preferably at least about 12 inches, average widths in the range of about 0.3 to 2.0 inches and average thickness in the range of about 0.01 to 0.05 inches, with a preferred range of about 0.020 to 0.030 inches for wafers in the face layers and about 0.030 to 0.050 inches for wafers in the core wafers, the panel having an oven dry wood density in the range of about 28 to 45 lbs. per cu. ft. with an MOR to density ratio of at least about 120 and an MOE(M) to density ratio of at least about 40. In other embodiments, phenol formaldehyde resin content is in the range of about 1½ to 8%, preferably 2 to 3%, based on the oven dry weight of the wood wafers for the face layers and core layers.

Figure 1:
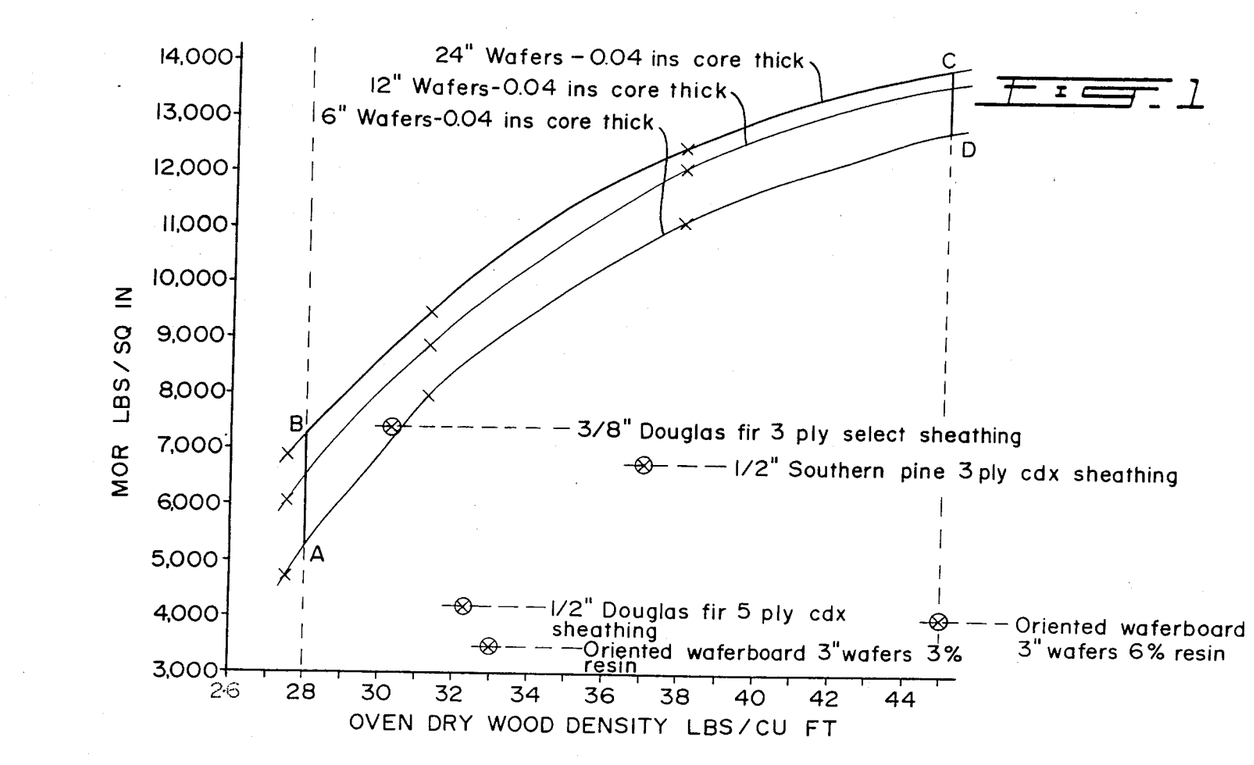
FIG. 1 is a graph comparing MOR against density for waferboard panels made from long wafers varying from 6 inches to 24 inches in length.
Figure 2:
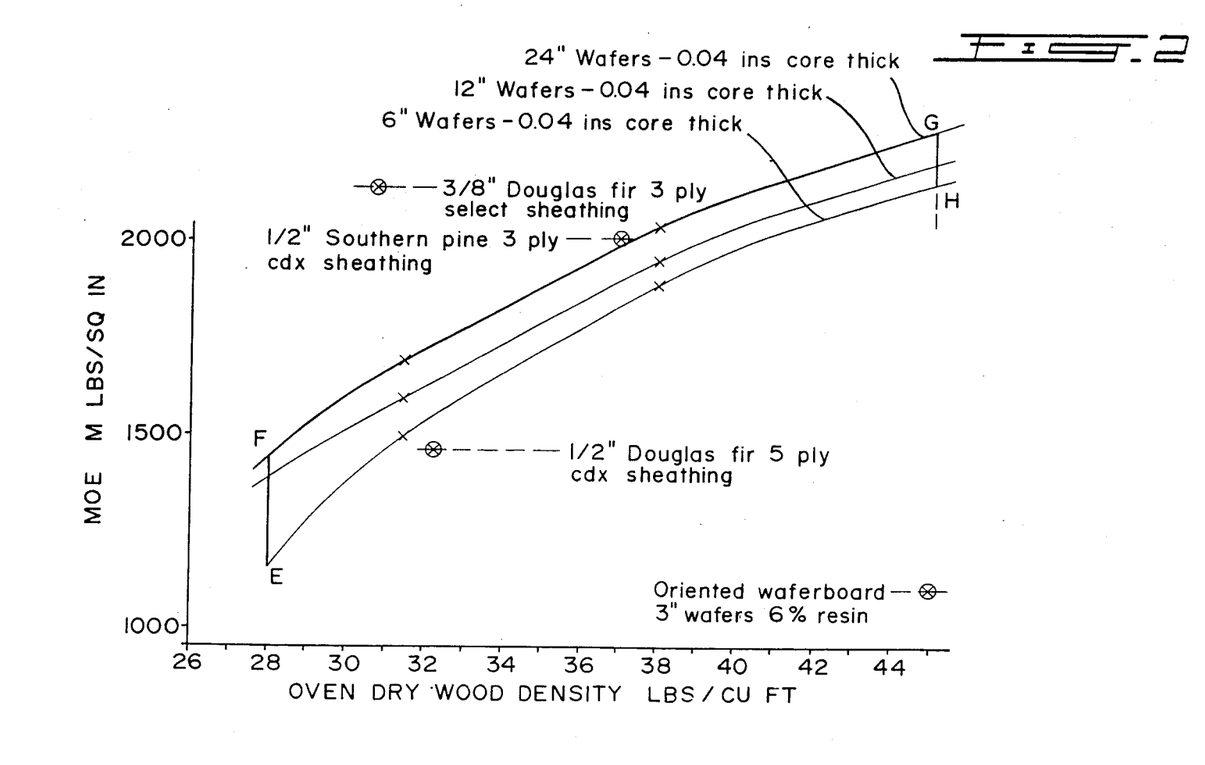
FIG. 2 is a graph comparing MOE(M) against density for waferboard panels made from long wafers varying from 6 inches to 24 inches in length.

In another embodiment, the panel having an MOR parallel to the orientation of the wafers in the face layers for an oven dry wood density in the range of about 28 to 45 lbs. per cu. ft. within the boundary of A, B, C and D in FIG. 1, and an MOE parallel to the orientation of the wafers in the face layers within the boundary of E, F, G and H in FIG. 2.

In further embodiments of the invention, the panel has face layers representing a range of about 30-60% of total thickness of the panel. Dry MOR and dry MOE of the panel in the direction perpendicular to the orientation of the wafers, is not less than about 20% of the dry MOR and dry MOE of the panel parallel to the orientation of the wafers. In still further embodiments, the core layer has a random orientation of wafers or a cross orientation of wafers.

In a preferred embodiment, each layer of wood wafers has a thickness greater than three wafers.

In drawings which illustrate the embodiments of the invention:

FIG. 3 is a graph comparing MOR against wafer length for long waferboard panels of the present invention at a density of 35 lbs. per cu. ft.

The term "wafers" used throughout the specification includes flakes, strands, plates and other terms sometimes used in different countries. Wafers may be made on conventional waferizers which cuts wafers to the desired shape or wafers may be cut or slit from veneer. In the present invention the wafers are made having a length greater than 6 inches, preferably greater than 12 inches, up to 24 inches or more. Greater lengths may be used but there appears to be little improvement in strength properties over this figure. Thicknesses of the wafers may vary from about 0.01 to 0.05 inches and width should be in the range from about 0.3 to 2.00 inches. It is preferred that the average wafer thickness in the face layers is in the range of about 0.020 to 0.030 inches and in the core layers, in the range of about 0.030 to 0.050.

The type of wood used in North America, particularly in the West Coast is generally a mixture of different types of hardwoods and softwoods having an initial aggregate specific gravity, oven dry weight with volume at 12% moisture content, of less than about 0.6. There are many types of wood used for wafers, both hardwood and softwood. Aspen, for instance, is a hardwood having a specific gravity in the range of 0.35-0.39. An example of a softwood is a Balsam fir.

Once the wafers are prepared, they are generally dried to reduce moisture content and then blended with wax and resin prior to being formed into a mat of wafers. Slack wax is a prepared wax generally blended with the wafers to improve water proof properties of the end product, and preferably powdered phenol formaldehyde resin is generally used for both face and core layers. Although reference is made to using powdered resin, it is also feasible to spray liquid resin onto the wafers. An example of such a blending system is shown in co-pending application U.S. Ser. No. 441,925 which describes a multiple stage blending of wood wafers with a liquid resin. The phenol formaldehyde resin content is preferably in the range of about 1½ to 8% based on the oven dry weight of the wood wafers for both face layers and core layers.

In the preparation of a waferboard panel, wafers are generally laid in at least three separate mats one on top of another before proceeding to a press where the layers of wafers are compressed and simultaneously heated to cure the resin. In a preferred embodiment, the face layers of a waferboard panel generally represent about 30-60% of the total thickness of the panel. The core layer, or core layers represent the remaining panel thickness. As the wafers are laid in the first layer, the long wafers are laid in an oriented fashion such that the mean orientation of the wafers laid in the mat are at an angle greater than zero degrees but not more than about 10° from the direction of orientation. If the orientation angle increases much beyond about 10°, then the strength in the direction of orientation of the panel is reduced. Alternatively, if the mean orientation of the wafers results in too small an angle, that is to say below about 2°, then the strength of the panel in the direction perpendicular to the direction of orientation is reduced. It has been found that an angle of orientation around 10° proves satisfactory, and it is preferred that the product have a strength and stiffness in the perpendicular direction to the direction of orientation of about 20% of the direction parallel to the orientation.

The core layer or core layers may be random oriented or cross oriented. The term "cross oriented" means that the wafers in the core layers are laid in a direction which is approximately 90° to the direction of orientation of the wafers in the face layers. In some embodiments a mixture of both random and cross oriented core layers are provided depending on the requirements of the waferboard panel. In the case of core layers, it is not imperative that the wafers be the same thickness or as long as those in the face layers. After the layers have been laid in mats one on top of another, the multi-layered mat advances to a press where in a preferred embodiment, each panel is compressed at a temperature of slightly above 200° C. for at least four minutes. The press is a standard unit well known in the manufacture of waferboard panels.

It has generally been found that the resin content is at least about 1.5% based on the oven dry weight of the wood wafers. In a preferred embodiment, the resin content for both face and core layers is in the range of about 2 to 3% based on the oven dry weight of the wood wafers. In one embodiment, 4% phenol formaldehyde resin was used in the face layers with 3% only in the core layer. The wax content was 2% based on the oven dry weight of the wood wafers.

TABLE I

| PRODUCT | WAFER LENGTH ins. | DENSITY lbs/cu ft | MOR lbs/ sq in | MOE (M) lbs/ sq. in. | MOR/ DENSITY | (MOE (M)/ DENSITY |
|---|---|---|---|---|---|---|
| PLYWOOD | | | | | | |
| ⅜" Douglas Fir 3 Ply Select Sheathing | — | 30.8 | 7260 | 2142 | 235.7 | 69.5 |
| ½" Southern Pine 3 Ply CDX Sheathing | — | 37 | 6730 | 2017 | 181.9 | 54.5 |
| ½" Douglas Fir 5 Ply CDX Sheathing | — | 32.3 | 4070 | 1460 | 126.0 | 45.2 |
| WAFERBOARD | | | | | | |
| Homogenous | 1½ | 41.5 | 2700 | 500 | 65.0 | 12.0 |
| Oriented 3% Resin | 3 | 33 | 3400 | 1016 | 103.0 | 30.8 |
| Oriented 6% Resin | 3 | 45 | 4000 | 1100 | 88.9 | 24.4 |
| LONG WAFER WAFERBOARD Core Wafer Thickness | | | | | | |
| 0.04" | 3 | 35 | 6700 | 1400 | 191.4 | 40.0 |
| " | 6 | 35 | 8000 | 1600 | 228.6 | 45.7 |
| " | 12 | 35 | 9000 | 1700 | 257.1 | 48.6 |
| " | 24 | 35 | 9700 | 1740 | 277.1 | 49.7 |

Comparisons of strength to density ratios are illustrated in Table I. As can be seen, the MOR to density ratio and MOE(M) to density ratio is far lower for normal waferboard than for plywood. Oriented strand board has improved properties but is still not comparable with plywood.

FIGS. 1 and 2 illustrate the strength properties for long wafer waferboard for varying densities made according to the present invention for different lengths of wafers. Oven dry wood densities from 28 to 45 lbs. per cu. ft. cover the range of densities for the long wafer waferboard product made from wafers having an initial aggregate specific gravity oven dry weight with volume at 12% moisture content of below 0.6. The ratios of MOR to density within the boundary lines A, B, C, D of FIG. 1 are at least 180. The ratios of MOE(M) to density within the boundary lines E, F, G, H of FIG. 2 are at least 40.

EXAMPLE I

Figure 4:
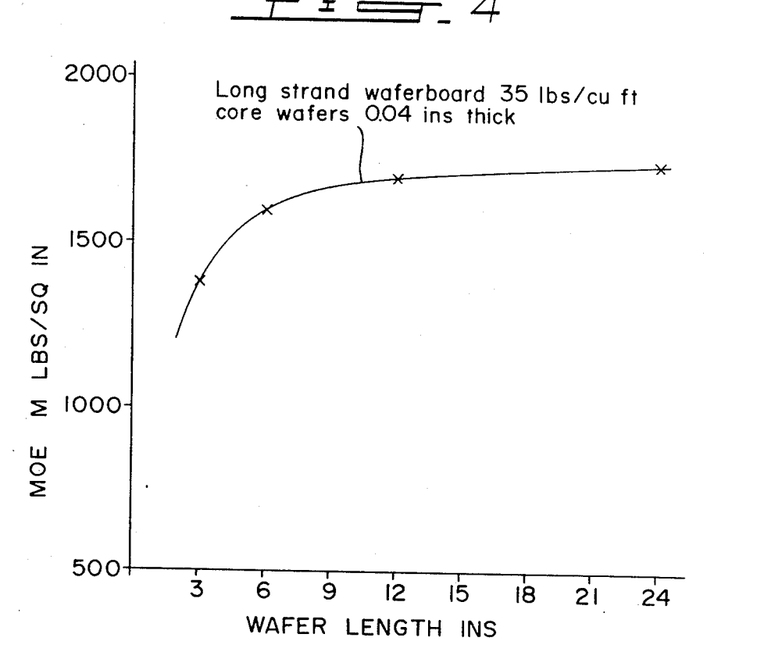
FIG. 4 is a graph comparing MOE against wafer length for long waferboard panels of the present invention at a density of 35 lbs. per cu. ft.

Waferboard samples were made by slitting wafers from veneer strips, cut from Aspen with an initial aggregate specific gravity oven dry weight with volume at 12% moisture content of approximately 0.38. The wafers in the face layers were 0.02 inches thick and were cut to 3, 6, 12 and 24 in lengths. The core wafers were 0.04 inches thick. The face layers were oriented with a mean orientation not greater than 10° and the core layer was cross oriented. 5% phenol formaldehyde resin was used in the panels whose overall thickness was ½ inch. The panels comprises three plies. FIGS. 3 and 4 illustrate the effect of strand length on MOR and on MOE. As can be seen in the figures, above a 12" wafer length, the curve commences to level out. There is believed to be no real improvement in strength properties beyond 24" long wafers.

EXAMPLE II

Waferboard samples were made from wafers cut on a commercial waferizer for nominal wafer lengths of 3, 4½, 6 and 12 inches. Actual wafer lengths varied substantially below the nominal length but had a mean value of up to about 20% below the nominal. The wood was Aspen, similar to the type of wood used in Example I. The thickness of the core wafers was 0.02 inches, the same thickness as the wafers in the face layers.

TABLE II

| PRODUCT | WAFER LENGTH ins. | | DENSITY lbs/cu ft | MOR lbs/ sq in | MOE (M) lbs/ sq. in | MOR/ DENSITY | (MOE (M)/ DENSITY |
|---|---|---|---|---|---|---|---|
| | Mean | Nominal | | | | | |
| Wafers cut on a waferizer | 2.4 | 3 | 33 | 2600 | 720 | 78.8 | 21.8 |
| 0.02 in. wafer | 3.6 | 4½ | 33 | 4150 | 950 | 125.6 | 28.8 |
| core thickness | 4.8 | 6 | 33 | 5400 | 1120 | 163.6 | 33.9 |
| | 9.6 | 12 | 33 | 8300 | 1460 | 251.5 | 44.2 |

As can be seen in Table II, the waferboard made from nominal 4½ inch long wafers had an MOR/Density ratio above 120 and an MOE(M)/Density ratio of about 30. The waferboard made from nominal 12 inch long wafers had an MOR/Density ratio of 250, and an MOE(M)/Density ratio of 44.

Figure 5:
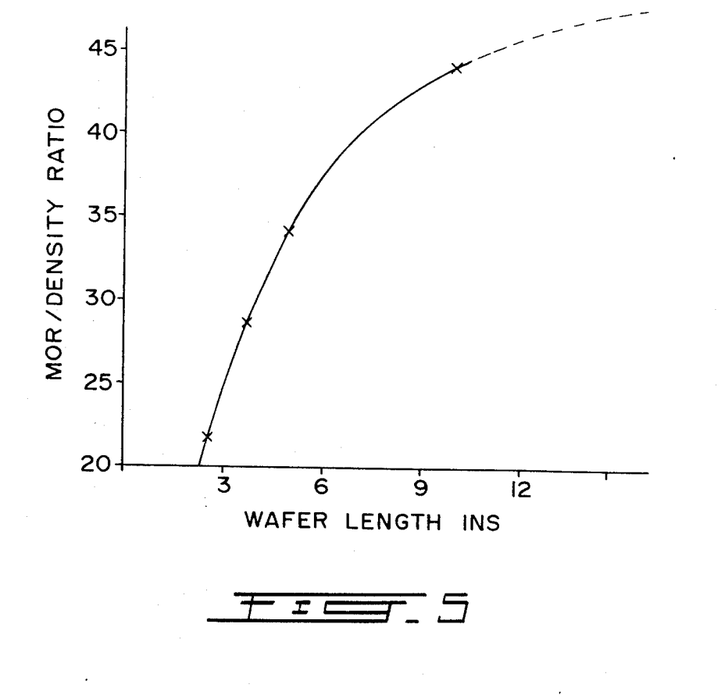
FIG. 5 is a graph comparing mean wafer lengths against MOE(M)/Density ratio for long waferboard panels of the present invention.
Figure 7:
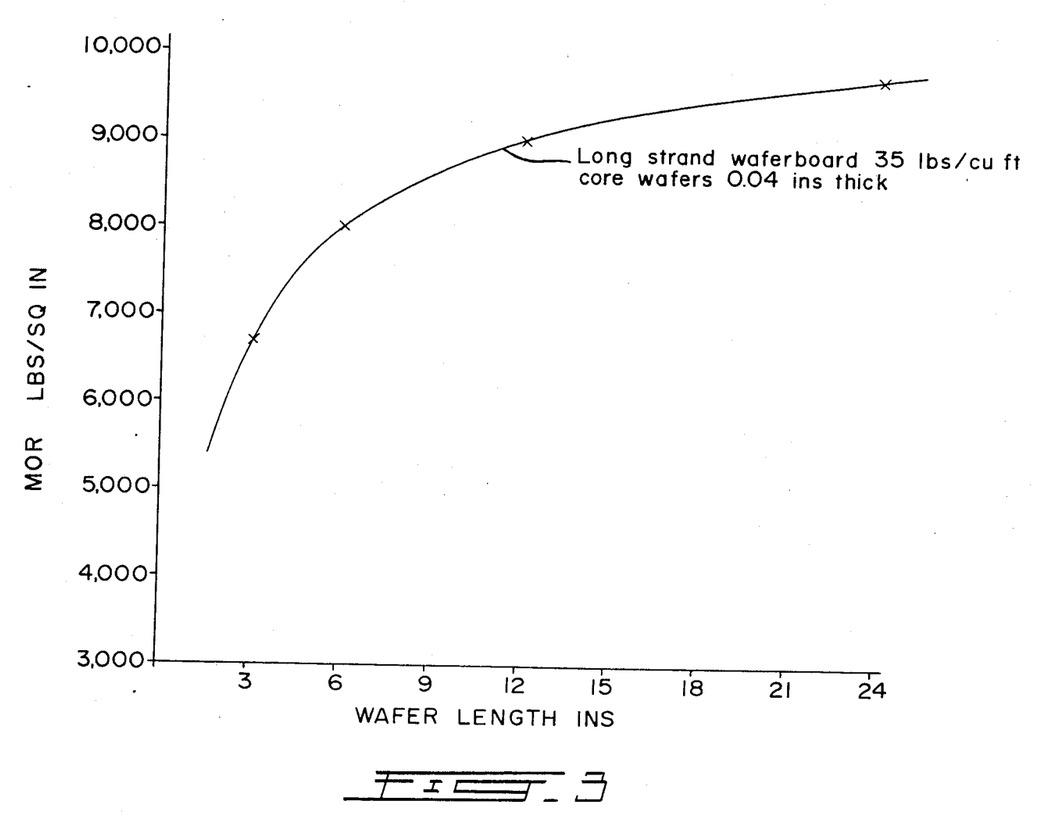

FIG. 5 illustrates the comparison between the mean wafer lengths against MOR/Density ratio for a waferboard having a wafer thickness of about 0.2 inches in both core layer and face layers. As can be seen, a mean wafer length of 6½ inches was required to attain a ratio of 40 in this test.

Various changes may be made to the waferboard panel according to the present invention without departing from the scope of the present invention which is limited only by the following claims.

The embodiments of the invention in which an exclusive property or privilege is claimed are defined as follows.

1. A waferboard panel with increased strength properties comprising at least three layers of wood wafers, having an initial aggregate specific gravity less than about 0.6 oven dry weight with volume at 12% moisture content, the panel having face layers on outside surfaces and at least one core layer, the wafers in the face layers having a mean orientation in the range of about 2° to 10°, the wafers in the face layers having lengths of at least about 6 inches, average widths in the range of about 0.3 to 2.0 inches, and average thickness in the range of about 0.01 to 0.05 inches, the panel having an oven dry wood density in the range of about 28–45 lbs. per cu. ft. with, an MOR to density ratio of at least about 120 and an MOE(M) to density ratio of at least about 40.

2. The waferboard panel according to claim 1 having a phenol formaldehyde resin content in the range of about 1½ to 8% based on the oven dry weight of the wood wafers for the face layers and core layers.

3. The waferboard panel according to claim 2 having a phenol formaldehyde resin content in the range of about 2 to 3% based on the oven dry weight of the wood wafers for the face layers and core layers.

4. The waferboard panel according to claim 1 wherein the average thickness of the wafers in the face layers is in the range of about 0.020 to 0.030 inches, and the average thickness of the wafers in the core layers is in the range of about 0.030 to 0.050 inches.

5. The waferboard panel according to claim 1 wherein the wafers in the face layers have lengths of at least about 12 inches.

6. The waferboard panel according to claim 1 wherein each layer of wood wafers has a thickness greater than three wafers.

7. A waferboard panel with increased strength properties comprising at least three layers of wood wafers having an initial aggregate specific gravity less than about 0.6, oven dry weight with volume at 12% moisture content, the panel having face layers on outside surfaces and at least one core layer, the wafers in the face layers having a mean orientation in the range of about 2 to 10 degrees, the face layers having wafers with lengths of at least about 6 inches, average widths in the range of about 0.3 to 2.0 inches and average thickness in the range of about 0.01 to 0.05 inches, the panel having an MOR parallel to the orientation of the wafers in the face layers for an oven dry wood density in the range of about 28 to 45 lbs. per cu. ft. within the boundary of A, B, C, D in FIG. 1, and an MOE parallel to the orientation of the wafers in the face layers within the boundary of E, F, G, H in FIG. 2.

8. The waferboard panel according to claim 7 having a phenol formaldehyde resin content in the range of about 1½ to 8% based on the oven dry weight of the wood wafers for the face layers and core layers.

9. The waferboard panel according to claim 8 having a phenol formaldehyde resin content in the range of about 2 to 3% based on the oven dry weight of the wood wafers for the face layers and core layers.

10. The waferboard panel according to claim 7 wherein the average thickness of the wafers in the face layers is in the range of about 0.020 to 0.030 inches, and the average thickness of the wafers in the core layer is in the range of about 0.030 to 0.050 inches.

11. The panel according to claim 7 wherein the face layers are about 30–60% of total thickness of the panel.

12. The panel according to claim 7 wherein dry MOR and dry MOE of the panel in the direction perpendicular to the orientation of the wafers, is not less than about 20% of the dry MOR and dry MOE of the panel parallel to the orientation of the wafers.

13. The panel according to claim 7 wherein a core layer has a random orientation of wafers.

14. The panel according to claim 7 wherein a core layer has a cross orientation of wafers.

15. The panel according to claim 7 wherein the wafers in the face layers have lengths of at least about 12 inches.

* * * * *

REEXAMINATION CERTIFICATE (1371st)
United States Patent [19]

Barnes

[11] B1 4,610,913

[45] Certificate Issued Oct. 16, 1990

[54] LONG WAFER WAFERBOARD

[75] Inventor: Derek Barnes, British Columbia, Canada

[73] Assignee: MacMillan Bloedel Limited, Vancouver, Canada

Reexamination Request:
No. 90/001,756, Apr. 20, 1989

Reexamination Certificate for:
Patent No.: 4,610,913
Issued: Sep. 9, 1986
Appl. No.: 829,564
Filed: Feb. 14, 1986

Related U.S. Application Data

[63] Continuation of Ser. No. 723,641, Apr. 16, 1985, abandoned.

[51] Int. Cl.$^5$ .................. B32B 5/02; B32B 5/16; B32B 21/02
[52] U.S. Cl. .................. 428/215; 428/218; 428/326; 428/528; 428/529; 428/535; 156/62.2
[58] Field of Search .................. 428/215, 218, 326, 528, 428/529, 535; 156/62.2

[56] References Cited

U.S. PATENT DOCUMENTS

| | | | |
|---|---|---|---|
| 30,636 | 6/1981 | Barnes | 428/294 |
| 2,773,789 | 12/1956 | Clark | 428/44 |
| 2,786,005 | 3/1957 | Clark | 428/44 |
| 3,164,511 | 1/1965 | Elmendorf | 428/110 |
| 4,122,236 | 10/1978 | Holman | 428/453 |
| 4,246,310 | 1/1981 | Hunt | 428/106 |
| 4,255,477 | 3/1981 | Holman | 428/106 |
| 4,361,612 | 11/1982 | Shaner | 428/106 |
| 4,494,919 | 1/1985 | Knudson | 425/83.1 |

OTHER PUBLICATIONS

"Raw Materials and Particle Geometry: Effects on Board Properties"; Modern Particle Board & Dry-Process Fiberboard Manufacturing; Maloney; Miller Freeman Publications; 1977; pp. 178–215.
Turner, "Effect of Particle Size & Shape on Strength and Dimensional Stability of Resin-Bonded Wood-Particle Panels," Journal of FPRS, pp. 210–223, Oct. 1954.
Elmendorf, "Wood Fibers from Veneer Waste", Paper Trade Journal, pp. 29–31, Feb. 9, 1950.
Shuler et al, "Effect of Flake Geometry on Mechanical Properties of Eastern Spruce Flake-Type Particleboard", Forest Products Journal; vol. 26, No. 6, pp. 24–28, Jun. 1976.
Ikeda et al, "Effect of Chip Length on Creep Properties of Particleboard", Mokuzai Gakkaishi 25(5), pp. 332–337, 1979, (Translation).
Leitner, "Structural Board: A Three-Layer Alternative to Waferboard and OSB", Proceedings of the 14th WSU International Symposium on Particleboard, pp. 31–38, Apr. 1980.
Clark, "How it all Started: The History of Waferboard," Canadian Waferboard Symposium, Publication SP505E, pp. 4–14, (1980).
Maloney, "Larger Flakes Give Illusion of Structural Board Strength," Plywood & Panel World, p. 16, Apr. 1983.
Walter et al, "Effect of Chip Size on Some Strength Properties of Oriented Structural Board", Holz Als Roh-Und Werkstoff 37, pp. 183–188, 1979, (Translation).
Vajda, "Waferboard vs Oriented Structural Board (OSB)," Proceedings of the Fourteenth Washington State University International Symposium on Particleboard, pp. 21–30, Apr. 1980.
Fyie, "Electrostatic Orientation for Engineering Composition Panel Properties", Proceedings of the 14th WSU International Symposium on Particleboard, pp. 261–280, (Apr. 1980).
Siempelkamp, "OSB Mat Forming Factors," pp. 1–6, 1983.
Wood Handbook: Wood as an Engineering Material, Forest Products Laboratory, U.S. Dept. of Agriculture; pp. 4–27 to 4–28, 1974.

Primary Examiner—George F. Lesmes

[57] ABSTRACT

A waferboard panel is made from long wafers to have the same strength properties as plywood. The panel comprises at least three layers of wood wafers having an initial aggregate specific gravity, less than about 0.6 oven dry weight with volume at 12% moisture content, the panel having face layers on outside surfaces and at least one core layer. The wafers in the face layers have a mean orientation not greater than about 10°, and lengths of at least about 6 inches, preferably 12 inches. Average widths of the wafers in the face layers are in the range of about 0.3 to 2.0 inches and the panel has an oven dry wood density in the range of about 28 to 45 lbs. per cu. ft. with an MOR to density ratio of at least about 120 and an MOE (M) to density ratio of at least, about 40.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–15 is confirmed.

* * * * *